(No Model.)

F. DOUGLAS.
BICYCLE.

No. 518,591. Patented Apr. 24, 1894.

Witnesses:
Chas. E. Gaylord,
Clifford W. White.

Inventor,
Frank Douglas,
By Banning & Banning & Payson,
Attorneys.

UNITED STATES PATENT OFFICE.

FRANK DOUGLAS, OF CHICAGO, ILLINOIS.

BICYCLE.

SPECIFICATION forming part of Letters Patent No. 518,591, dated April 24, 1894.

Application filed December 7, 1891. Serial No. 414,272. (No model.)

*To all whom it may concern:*

Be it known that I, FRANK DOUGLAS, a citizen of the United States, residing at Chicago, Illinois, have invented certain new and useful Improvements in Bicycles, of which the following is a specification.

The object of my invention is to lighten and strengthen the construction of bicycles in certain particulars, as hereinafter described and claimed.

Figure 1:
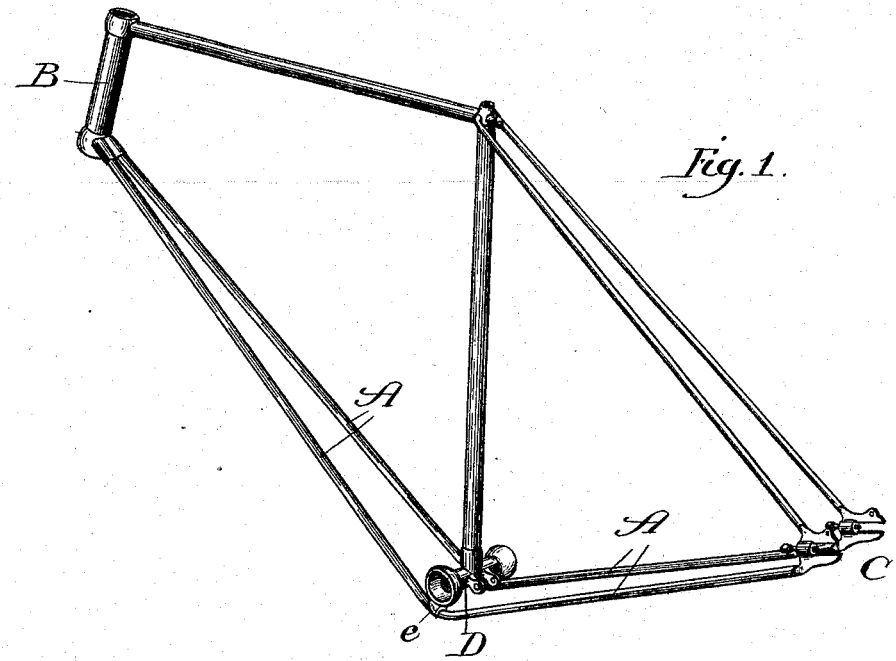
Figure 2:
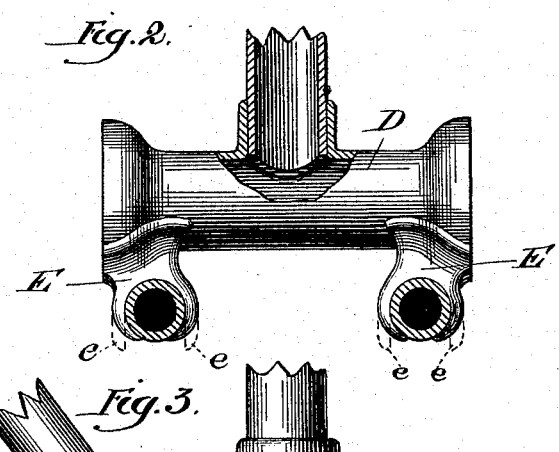
Figure 3:
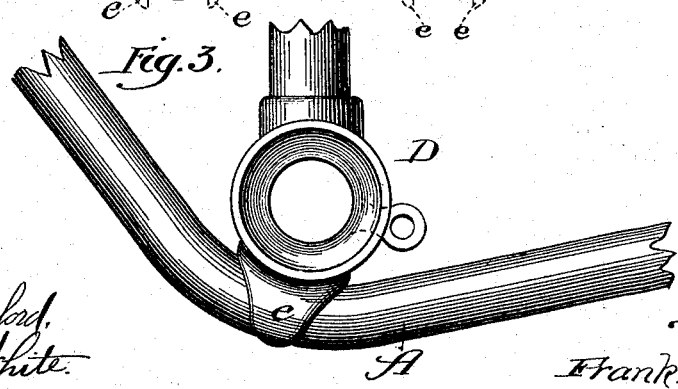

In the drawings, Figure 1 is a perspective view of the frame of a bicycle. Fig. 2 is an end elevation, partly in section, of the crank shaft case; and Fig. 3 is an elevation of the same.

In making my improvements I make the lower brace tubes, A, which run from the steering head casing B to the rear fork C, form one continuous piece, instead of making them of separate pieces, as heretofore, and brazing or otherwise attaching their ends to the crank shaft case. I bend these tubes into the proper form, so that they will extend under the crank shaft case D at or near its ends, so that the case may rest upon and be supported by the tubes.

In order to secure a firm and rigid connection between the case and the brace tubes, I provide the case preferably with downwardly projecting clips E, that may be either integral with the crank shaft casing, or in separate parts and afterward attached in any suitable or desired way. These clips are also preferably provided with projecting fingers e, as shown in Figs. 2 and 3. The position of these fingers, before the brace tubes are arranged and secured in place, is shown by dotted lines in Fig. 2. After the tubes are put in place, the fingers are bent in as shown in full lines, so as to securely clasp and hold the same. When thus arranged in position, the clips and tubes may be brazed together, or otherwise securely connected, so as to make a rigid and permanent connection. When the brace tubes are thus arranged and fastened in place, they operate as truss rods to firmly brace and hold the parts of the frame in their desired position.

I claim—

1. In bicycle frames, a crank shaft casing provided with an upward central extension adapted to receive a seat post tube, and downward end extensions adapted to receive continuous lower frame truss tubes, substantially as described.

2. In bicycle frames, a crank shaft casing provided with an upward central extension adapted to receive a seat post tube, and downward end extensions adapted to receive lower continuous frame truss tubes, in combination with a central seat post tube and continuous lower frame truss tubes seated and clasped in their several extensions, respectively, substantially as described.

FRANK DOUGLAS.

Witnesses:
THOMAS A. BANNING,
ANNIE C. COURTENAY.